United States Patent [19]

Clement et al.

[11] Patent Number: 5,015,417

[45] Date of Patent: May 14, 1991

[54] NONLINEAR OPTICAL DEVICES FOR DERIVATIVES OF STILBENE AND DIPHENYLACETYLENE

[75] Inventors: Robert A. Clement; Ying Wang, both of Wilmington, Del.

[73] Assignee: E. I. Du Pont de Nemours and Company, Wilmington, Del.

[21] Appl. No.: 155,025

[22] Filed: Feb. 11, 1988

[51] Int. Cl.$^5$ .................................................. F21V 9/04
[52] U.S. Cl. ..................................... 252/587; 252/582; 350/354; 350/96.12; 350/96.13; 350/96.14
[58] Field of Search ....................... 252/582, 587, 589; 350/1.1, 354, 3.64, 96.12, 96.13, 96.14, 350 R; 558/402; 568/631, 745

[56] References Cited

U.S. PATENT DOCUMENTS 4,909,964  3/1990  Clement et al. ...................... 252/589

FOREIGN PATENT DOCUMENTS

| | | | |
|---|---|---|---|
| 62608 | 10/1982 | European Pat. Off. ............ | 252/582 |
| 61-260031 | 11/1986 | Japan ............................... | 350/350 R |
| 62-136601 | 6/1987 | Japan .................................... | 252/587 |
| 62-156628 | 7/1987 | Japan .................................... | 252/587 |
| 62-160427 | 7/1987 | Japan .................................... | 252/587 |
| 1331228 | 9/1973 | United Kingdom ................ | 252/587 |

OTHER PUBLICATIONS

Tabei, H. et al., Appl. Phys. Lett. 50(26) 1855, 1987.
Stiegman, A. E. et al., J.A.C.S. 109(19) 5885, 1987.
Wang, Y. et al., Chem. Phys. Lett. 148(2,3) 136, 1988.
Oudar, J. L., J. Chem. Phys. 67(2) 446, 1977.
Kawski, A. et al., Z. Naturforsch, A.: Phys. Sci., 42(6), 617-21, 1987.
Buckley, A. et al., Proceedings: ACS Meeting, N.Y., 1986.
Tam, W. et al., S.P.I.E., vol. 971, 107, 1988.
Ulman, A., J. Phys. Chem. 92, 2385, 1988.
Tweig, R. J., Report UCRL-15706, 1985.
Williams, D. J., Angew Chem. Int. Ed. Engl. 23, 690, 1984.
Franken et al., Physical Review Letters, vol. 7, 118-119 (1961).
Coda et al., J. Appl. Cryst., vol. 9, 193 (1976).
Kurihara et al., J. Chem., Soc. Chem. Commun., 959-960 (1987).
Fouguey et al., J. Chem. Soc., Chem. Commun., 1424-6 (1987).

*Primary Examiner*—John S. Maples
*Assistant Examiner*—Richard Treanor

[57] ABSTRACT

Certain derivatives of stilbene and diphenylacetylene are capable of second harmonic generation when illuminated by coherent optical radiation.

5 Claims, No Drawings

NONLINEAR OPTICAL DEVICES FOR DERIVATIVES OF STILBENE AND DIPHENYLACETYLENE

BACKGROUND OF THE INVENTION

1. Field of the Invention

This invention relates to nonlinear optical systems, and particularly to substituted stilbenes and diphenylacetylenes capable of second harmonic generation (SHG) and having other useful nonlinear optical and electro-optic properties.

2. Description of Related Art

The nonlinear optical response of a molecule can be described by the following expansion:

$$\mu = \mu_o + \alpha E + \beta EE + \lambda EEE + \ldots$$

where $\mu$ is the induced dipole moment and $\mu_o$ is the permanent dipole moment of the molecule; $\alpha$, $\beta$, and $\lambda$ are the linear, second order and third order polarizabilities, respectively; E is the applied electric field. To describe an ensemble of molecules such as a crystal, the macroscopic relationship should be used:

$$P = P_o + \chi^{(1)} E + \chi^{(2)} EE + \chi^{(3)} EEE + \ldots$$

where P is the induced polarization and $P_o$ is the permanent polarization; $\chi^{(1)}$, $\chi^{(2)}$ and $\chi^{(3)}$ are the linear, second order and third order susceptibility, respectively. Second order nonlinear optical phenomena such as second harmonic generation (SHG), sum and difference frequency generation, parametric processes and electro-optical effects all arise from the $\chi^{(2)}$ term. To have a large $\chi^{(2)}$, a molecule should both possess a large $\beta$ and crystallize in a noncentrosymmetric structure. Centrosymmetric crystals have vanishing $\chi^{(2)}$ and are therefore incapable of second harmonic generation.

Franken, et al., Physical Review Letters, Vol. 7, 118–119 (1961), disclose the observation of second harmonic generation upon the projection of a pulsed ruby laser beam through crystalline quartz. They observed the generation of the second harmonic of light, in which light of 6943 Å was converted to light of 3472 Å. The use of a laser remains the only practical way to generate an E large enough to be able to detect the SHG phenomenon.

Coda et al., J. Appl. Cryst., Vol. 9, 193 (1976), disclose SHG in a powder sample of 4-methoxy-4'-nitrostilbene.

Kurihara, et al., J. Chem. Soc., Chem. Commun., 959–960 (1987), disclose the synthesis of 4-methoxy-4'-nitrotolan (MNT) (i.e., 4-methoxy-4'-nitrodiphenylacetylene) and the use of MNT for second harmonic generation.

Fouquey, et al., J. Chem. Soc. Chem. Commun., 1424–6 (1987), disclose the preparation and crystal phase transition temperatures for several 4-amino-4'-nitrostilbene and 4-nitrodiphenylacetylene derivatives. Non-linear optical properties, including second harmonic generation, are noted for selected compounds.

Useful reviews of the art relating to nonlinear properties of organic materials are given in the following references: "Nonlinear Optical Properties of Organic and Polymeric Materials", D. J. Williams, ed., American Chemical Society, Washington, D.C. (1983); D. J. Williams, Angew. Chem., Int. Ed. Engl., Vol. 23, 690 (1984); "Nonlinear Optical Properties of Organic Molecules and Crystals", Vol. 2, D. S. Chemla, et al., ed., Associated Press, Orlando, Fla. (1987).

Although a large number of organic and inorganic materials capable of SHG have been found since Franken's discovery, an intense search continues. Through many years of research, it is now believed that an organic molecule having a conjugated $\pi$ electron system or a low-lying charge transfer excited state often has a large second order polarizability, $\beta$. Many molecules with large $\beta$ have been discovered based on these principles. However, many of these molecules have vanishing $\chi^{(2)}$ because of their unfavorable centrosymmetric crystal structures and therefore have no practical use. To this date, there is no absolute way of predicting whether a molecule can crystallize in a noncentrosymmetric structure.

SUMMARY OF THE INVENTION

The present invention provides a nonlinear optical device capable of second harmonic generation, comprising a nonlinear optical element and a source of coherent optical radiation, said nonlinear element comprising a crystalline compound which is crystallized in a noncentrosymmetric space group, said compound being chosen from the group consisting of

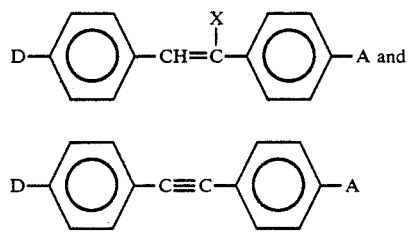

wherein A is selected from Br, Cl, F, or I;
wherein D is selected from —OR, —NR₂ or —C(O)R
where R is selected from H, $C_1$–$C_{10}$ branched or unbranched alkyl or $C_1$–$C_{10}$ branched or unbranched hydroxyalkyl; and
wherein X is selected from H, CN, Br, I, Cl, F or $C_1$–$C_4$ branched or unbranched alkyl.

The invention also provides a method of generating second harmonic radiation using the nonlinear optical device. The invention also provides an electro-optic modulator using the nonlinear optical device.

DETAILED DESCRIPTION OF THE INVENTION

It has been found that certain derivatives of stilbene and diphenylacetylene have not only large $\beta$, but also large $\chi^{(2)}$. These compounds have been shown to be capable of second harmonic generation.

Preparation for a stilbene derivative used in the nonlinear optical devices of this invention has been disclosed: trans-4-bromo-4'-methoxystilbene by G. D. Diana et al., J. Med. Chem., Vol. 21, 889–894 (1978). Preparation for a stilbene derivative that can be used in the nonlinear optical device of this invention is given in the example.

It has also been found that the crystal structure of the stilbene derivatives can depend on the method used to obtain the crystals. Thus, the SHG efficiency for a given compound will depend on the method used to obtain the crystals. Suitable recrystallation solvents include ethyl acetate, dioxane, tetrahydrofuran, alcohols (e.g., methanol and ethanol), acetone, acetonitrile, chlorinated solvents (e.g., dichloromethane and chloroform), aromatic solvents (e.g., benzene and toluene), hydrocarbons (e.g., hexane) or mixtures of two or more of the above solvents. Noncentrosymmetric crystals may also be obtained from the melt.

The nonlinear optical device of the invention comprises means to direct at least one incident beam of electromagnetic radiation into an optical element having nonlinear optical properties whereby electromagnetic radiation emerging from said element contains at least one frequency different from the frequency of any incident beam of radiation, said different frequency being an even multiple of the frequency of one incident beam of electromagnetic radiation; said optical element comprising a crystalline compound which is crystallized in a noncentrosymmetric space group, said compound being selected from the formulae given previously and being preferably trans-4-bromo-4'-methoxystilbene. Other useful preferred compounds include:

trans-4-bromo-4'-ethoxystilbene;
trans-4-iodo-4'-methoxystilbene;
1-cyano-1-(4-methoxyphenyl)-2-(4-bromophenyl)ethylene;
1-cyano-1-(4-methoxyphenyl)-2-(4-iodophenyl)ethylene;
1-bromo-1-(4-methoxyphenyl)-2-(4-bromophenyl)ethylene;
1-iodo-1-(4-methoxyphenyl)-2-(4-iodophenyl)ethylene;
1-methyl-1-(4-methoxyphenyl)-2-(4-bromophenyl)ethylene;
1-methyl-1-(4-methoxyphenyl)-3-(4-iodophenyl)ethylene;
4-bromo-4'-methoxydiphenylacetylene; and
4-iodo-4'-methoxydiphenylacetylene.

Preferably, the emerging radiation of a different frequency is doubled (second order) (SHG). Preferably, the electromagnetic radiation is radiation from one of a number of common lasers, such as Nd-YAG, Raman-shifted Nd-YAG, semiconductor diode, and Ar or Kr ion.

An optical element in accordance with the present invention is oriented in one of a potentially infinite number of crystal orientations which achieve partially maximized SHG conversion by virtue of phase matching. The specific orientation is chosen for reasons of noncriticality, maximum nonlinearity, increased angular acceptance, etc. Polarized light of wavelength $1.06\mu$ from an Nd-YAG laser is incident on the optical element along the optical path. A lens focuses the light into the optical element. Light emerging from the optical element is collimated by a similar lens and passed through a filter adapted to remove light of wavelength $1.06\mu$ while passing light of wavelength $0.53\mu$.

The optical element is preferably a single crystal having at least one dimension of about 0.5 mm or greater but can be substantially smaller crystals imbedded in a film of polymer or in glass. The smaller crystals can be randomly oriented or aligned with the same orientation, and are preferably aligned. For the smaller crystals, if their size is small enough to prevent light scattering, they can be dispersed in the polymeric binder and pressed, molded or shaped into an optically clear element capable of SHG. The polymer binder should be chosen to be a non-solvent for the aromatic compound. For larger crystallites, similar elements can be prepared if the binder used has an index of refraction matched to the complex, so as to prevent light scatter yet remain transparent.

It will be further apparent to those skilled in the art that the optical elements of the invention are useful in other devices utilizing their nonlinear properties, such as sum and difference frequency mixing, parametric oscillation and amplification, and devices utilizing the electro-optic effect. The use of crystals having nonlinear optical properties in optical devices is also disclosed in U.S. Pat. Nos. 3,747,022, 3,328,723, 3,262,058 and 3,949,323.

The electro-optic modulator of the invention comprises means to direct a coherent beam into an optical element, and means to apply an electric field to said element in a direction to modify the transmission property of said beam, said optical element meeting the description given above for the optical element for the nonlinear optical device of the invention. The preferred optical elements for the nonlinear optical device and electro-optic modulator of the invention are those embodiments set forth earlier herein for the nonlinear optical element.

An electro-optic modulator embodying the invention utilizes an optical element. A pair of electrodes and is attached to the upper and lower surfaces of the element, across which a modulating electric field is applied from a conventional voltage source. An optical element is placed between two polarizers and. A light beam, such as that from a Nd-YAG laser, is polarized by a polarizer, focused on the optical element, propagated through the crystal or crystals and subjected to modulation by the electric field. The modulated light beam is led out through an analyzer polarizer. Linearly polarized light traversing the element is rendered elliptically polarized by action of the applied modulating voltage. A polarizer renders the polarization linear again. Application of the modulating voltage alters the birefringence of the optical element and consequently the ellipticity impressed on the beam. The polarizer then passes a greater or lesser fraction of the light beam as more or less of the elliptically polarized light projects onto its nonblocking polarization direction.

It is understood that the invention has been described with reference to preferred embodiments thereof and that variations are to be included within the scope of the invention. Furthermore, frequency or phase modulation of the light beam by the modulator is possible, although the embodiment specifically described performs intensity modulation.

The invention is further illustrated by the following example. The reaction was conducted under nitrogen. SHG was measured by the powder method of Kurtz, et al., J. Appl. Phys., Vol. 39, 3798 (1968), using a Nd-YAG laser ($\omega = 1.064$ $\mu$m) and urea as a reference. The polycrystalline urea powder used as a reference had an average particle size of 90 $\mu$m to 125 $\mu$m. The intensity of the second harmonic radiation generated by the sample was measured relative to that provided by urea.

EXAMPLE 1

Trans-4-Bromo-4'-Methoxystilbene

A slurry of sodium hydride (50% dispersion in oil, 77 g, 1.60 mole) in glyme (2.7 L) was placed in a 5 L round-bottom flask fitted with a mechanical stirrer, a condenser, a pressure-equalizing dropping funnel and a thermometer. Dimethylphosphite (176 g, 1.60 mole) was added to the slurry via the dropping funnel over a period of one hour at a rate sufficient to maintain a brisk evolution of hydrogen. Occasional cooling in an ice bath was required to maintain the temperature near ambient. The mixture was stirred at ambient for an additional hour, by the end of which time gas evolution was much reduced. A solution of 4-bromobenzyl bromide (400 g, 1.60 mole) in glyme (900 mL) was added dropwise to the flask over a period of 1 h, while maintaining the temperature of the reaction mixture near ambient by occasional immersion of the flask in an ice bath. The mixture was stirred at ambient temperature for an additional 16 h. At the end of this time, thin layer chromatographic analysis (silica gel/cyclohexane) showed the absence of benzyl bromide, and the reaction to the benzyl phosphonate was assumed to be complete.

4-Methoxybenzaldehyde (218 g, 1.6 mole) and methanol (200 mL) were added to the benzyl phosphonate, followed by the addition of sodium methoxide (87 g, 1.6 mole). The sodium methoxide was added in portions over a period of 2 h at such a rate that the temperature of the reaction could be conveniently maintained near ambient by occasional immersion of the flask in an ice bath. After addition of the methoxide was complete, stirring was continued at ambient for an additional 16 h. During the addition of the methoxide, a creamy white precipitate formed, and at the end of the reaction the flask was thick with this precipitate.

The reaction mixture was stirred into ice and water (12.5 L). The precipitate was collected by filtration, washed with water and dried to give the product, trans-4-bromo-4'-methoxystilbene (394.9 g, 85%). Recrystallization of this sample from ethyl acetate (50 g/1.2 L) gave a pinkish-white solid (262.2 g, 57%), m.p. 202.5°–203.0° C.

Anal. Calcd. for $C_{15}H_{13}BrO$: C, 62.30; H, 4.53; Br, 27.63. Found: C, 62.06, 62.5; H, 4.73, 4.88; Br, 27.60, 27.56. The ir and nmr spectra are consistent with the assigned structure.

A sample of this compound was prepared for SHG measurements by recrystallization from ethyl acetate. SHG results are presented in the Table.

TABLE

| SHG DATA FOR COMPOUND USED IN EXAMPLE 1 | | |
| --- | --- | --- |
| Example | SHG, relative to urea | Growing Medium |
| 1 | 7 | Ethyl acetate |

What is claimed is:

1. A nonlinear optical device capable of second harmonic generation comprising a nonlinear optical element, a source of coherent optical radiation, and means for direct said radiation into said element, said nonlinear optical element comprising a crystalline compound of the formula

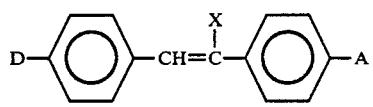

wherein A is selected from Br, Cl, F or I;
wherein D is —OR, where R is selected from H, $C_1$–$C_{10}$ branched or unbranched alkyl or $C_1$–$C_{10}$ branched or unbranched hydroxyalkyl; and
wherein X is selected from H, CN, Br, I, Cl, F or $C_1$–$C_4$ branched or unbranched alkyl; said compound being crystallized in a noncentrosymmetric space group.

2. An optical device as in claim 1 wherein D is —OR and R is methyl.

3. An optical device as in claim 1 wherein the compound of said optical element is trans-4-bromo-4'-methoxystilbene.

4. A method of generating second harmonic radiation comprising illuminating a nonlinear optical element as defined in claim 1 with coherent optical radiation.

5. In an electro-optic modulator comprising means to direct a coherent beam of radiation into an optical element and means to apply an electric field to said optical element in a direction to modify the transmission of said beam, the improvement wherein said beam is directed into the optical element defined in claim 1.

* * * * *